United States Patent [19]

Schultes et al.

[11] Patent Number: 5,402,449
[45] Date of Patent: Mar. 28, 1995

[54] PROCESS AND DEVICE FOR CONVERTING DIGITALLY MODULATE HIGH-FREQUENCY RECEPTION SIGNALS

[75] Inventors: Gerhard Schultes, Strasshof; Arpad-Ludwig Scholtz; Ernst Bonek, both of Vienna, all of Austria

[73] Assignee: Siemens Aktiengesellschaft, Munich, Germany

[21] Appl. No.: 834,551

[22] PCT Filed: Aug. 8, 1990

[86] PCT No.: PCT/EP90/01305

§ 371 Date: Feb. 11, 1992

§ 102(e) Date: Feb. 11, 1992

[87] PCT Pub. No.: WO91/02421

PCT Pub. Date: Feb. 21, 1991

[30] Foreign Application Priority Data

Aug. 11, 1989 [AT] Austria ................................. 1923/89

[51] Int. Cl.⁶ .......................................... H04L 27/06
[52] U.S. Cl. ........................................ 375/94; 329/306; 375/329; 375/344; 375/345
[58] Field of Search ................. 375/49, 52, 56, 80, 375/83, 84, 94, 98, 102, 97, 39, 88; 329/302, 306, 307; 455/182.2, 192.2

[56] References Cited

U.S. PATENT DOCUMENTS

| 4,438,524 | 3/1984 | Muilwijk | 375/80 |
| 4,608,703 | 8/1986 | Kaga et al. | 375/39 |
| 4,737,969 | 4/1988 | Steel et al. | 375/39 |
| 4,866,395 | 12/1989 | Hostetter | 375/39 |
| 4,879,728 | 11/1989 | Tarallo | 375/80 |
| 4,888,793 | 12/1989 | Chanroo et al. | |
| 4,958,360 | 9/1990 | Sari | 375/102 |

FOREIGN PATENT DOCUMENTS

| 0271121 | 6/1988 | European Pat. Off. | |
| 0291947 | 11/1988 | European Pat. Off. | 375/80 |
| 0353779 | 2/1990 | European Pat. Off. | |

OTHER PUBLICATIONS

Telcom Report 10 (1987) issue 2, pp. 130-137.
"Bandwidth & Power Efficient Satellite TDMA Demodulator" by Hoeber et al, Proceedings ICDSC-7, 7th International Conference on Digital Satellite Communications, May 12, 1986, pp. 573-578.

*Primary Examiner*—Stephen Chin
*Assistant Examiner*—Don Vo
*Attorney, Agent, or Firm*—Hill, Steadman & Simpson

[57] ABSTRACT

In a receiver for digitally modulated signals in mobile communication systems, the reception signal can be represented as a complex vector. The signal undergoes homodyne or heterodyne incoherent conversion into the baseband by means of a mixing stage with mixers M. This involves splitting into the real component and the imaginary component. The signal components are filtered by low-pass filters (TP) and digitized with analog-digital converters (AD). The sampled values are converted into the magnitude and angle of the vector. The magnitude value (B) controls the gain of the preamplifier (VV) and of the low-pass filters (TP), the reception data (D) are recovered from the difference between two successive angle values (W).

8 Claims, 3 Drawing Sheets

PROCESS AND DEVICE FOR CONVERTING DIGITALLY MODULATE HIGH-FREQUENCY RECEPTION SIGNALS

BACKGROUND OF THE INVENTION

The invention relates to a method of converting a digitally modulated reception signal from the radio-frequency range, in which the reception signal, which can be represented as a complex vector, is converted incoherently into the baseband. The invention relates furthermore to a receiver for digitally modulated signals in a mobile communication system, the antenna of which is connected to at least one mixing stage for the reception signal which can be represented as a complex vector, the mixing stage being followed by two low-pass filters which are connected on the output side via an analog-digital converter in each case to a value converter.

A receiver operating by such a method is known from PCT International Publication WO 86/3356. The reception signal is converted by two mixers with a local oscillator in correct phase relation and phase-shifted by 90°. Low-pass filters and analog-digital converters are followed by a digital filter. The decoding of the transmitted bits is performed with a ROM, operating as a value converter, which is followed by a multiplexer (FIG. 17).

A reception method and a receiver for cordless telephones is described in Telcom Report 10 (1987), issue 2, pages 130 to 137. The reception signal is mixed into the baseband via a radio-frequency stage and a plurality of intermediate-frequency stages. The demodulation is performed in phase-locked loop.

In general, digitally modulated signals are processed by synchronous or, more rarely, asynchronous heterodyne receivers. An image frequency suppression is performed at the radio-frequency stage, the main selection at one to two intermediate-frequency stages. Limiter amplifiers or gain controls provide the necessary compensation of the dynamic range of the input signal. Linear modulation methods divide into two-stage methods with binary amplitude modulation (BAM) and binary phase-shift keying (BPSK), four-stage methods with quadrature amplitude modulation (QAM) and quadrature phase-shift keying (QPSK), as well as multistage modifications. Customary non-linear modulation methods are FSK or frequency modulation-like methods, such as minimum-shift keying (MSK) and Gaussian minimum-shift keying (GMSK). The demodulation is performed for non-linear modulation methods by means of phase lock loop, Costa's loop or discriminators. For linear modulation methods, synchronous quadrature demodulators are used.

SUMMARY OF THE INVENTION

The invention is based on the object of permitting the processing of signals digitally modulated at two or more stages with a receiver.

According to the present invention, this is achieved by arranging that the reception signal is split into a real component and an imaginary component, continuous in time and amplitude, the phase difference per bit period due to the incoherent conversion being kept to less than half the phase shift caused by the modulation per bit, the signal components are subsequently amplified, filtered and sampled, the sampling time being determined within a preceding synchronization time, the sampled signals are subsequently digitized and the sampled values are value-converted as a pair of binary numbers for the magnitude and angle of the vector, the magnitude value serving for gain control and reception data being recovered from the difference between two successive angle values after classification.

Due to a homodyne mode of operation, the occurrence of an image frequency is avoided. The incoherent demodulation avoids complex carrier synchronization and allows DC voltage-free signal paths. The phase difference is kept small by frequency correction or oscillators with exact frequency stability. In spite of using only one mixing stage, with this method of reception virtually all two-stage and multistage, linear and non-linear modulation methods can be employed.

An efficient angle decoding beyond 360° is achieved by an angle value being buffer-stored over a bit period, subtracted from the following value by two's complement and the reception data recovered from a classification of the result dependent on the modulation method used. The adaptation to the individual modulation method is performed by means of a programmable setting of the classification, as a result of which no modification of the circuitry is necessary.

It is advantageous that the sampling time for the angle value of a linearly modulated reception signal is determined within a synchronization time before the transmission of valid data by the variation of the magnitude of the reception signal being modulated with a synchronization sequence and, after conversion into the baseband, the sign function formed and digitally differentiated, a zero pulse sequence being formed, the timing of the pulses in relation to the system clock measured and averaged over several bits. From the rotation of the vector of the reception signal, a correction of the phase difference is derived by incoherent conversion.

Furthermore, it is advantageous that the sampling time for the angle value of a non-linear modulated reception signal is determined within a synchronization time before the transmission of valid data by the carrier which has been angle-modulated with the synchronization sequence being oversampled after conversion into the baseband and from it a phase deviation obtained, from this a phase difference being formed by subtracting over a bit period, the angle sign function of which phase difference is compared in terms of phase with the data clock and the phase shift averaged over several bits.

The object of the invention is also achieved by the low-pass filters being provided with variable gain, by the value converter including means for determining the magnitude and angle of the vector of the reception signal from its real component and its imaginary component and being connected to a decoder, which contains a classifier, for reception data recovery, and by an adjusting device being connected to the value converter and the decoder for determining the sampling time.

The conversion into the baseband using a mixing stage dispenses with radio-frequency circuitry. After the radio-frequency prestage, the circuit components can be fully integrated by Si-bipolar or MOS technology. It is no longer required to tune radio-frequency or inter-mediate-frequency stages. The control behavior of the digital amplitude control is programmable and can be changed without modification of the circuitry. Undesired signal components are removed by the low-pass filters.

It is advantageous that the mixing stage is designed as a quadrature demodulator, which comprises two mixers which are connected to a local oscillator for feeding with an oscillator signal phase-shifted by 0° and 90° and the local oscillator has a tuning input which is connected to an offset correction device. The local oscillator is not coupled in locked-phase relation to the input signal, thus dispensing with circuitry for synchronization. The carrier frequency offset from the phase shift of the incoherence of the frequency of input signal and local oscillator is minimized by means of the tuning input. Its value is obtained when determining the sampling time and no longer has to be additionally calculated.

It is advantageous that the gain factor of the low-pass filters can be set digitally and the value converter is coupled back to the low-pass filters for this control. To eliminate DC voltage components, the low-pass filters contain DC isolating capacitors. They therefore act as bandpass filters with a band of several decades.

To reduce the current consumption and the processing of high data rates, it is advantageous that the value converter comprises two permanent memories, the data addresses of which are formed by the numerical values for the real component and the imaginary component of the sampled values, and that the magnitude value and the angle value are available at the data output of the respective permanent memory.

In order to be able to extend the demodulation of the reception signal to extremely high frequencies, it is advantageous that the mixing stage is preceded by at least one intermediate-frequency converter. The range of application of the receiver is extended by the fact that it can be adapted by different intermediate-frequency converters to different reception frequencies.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
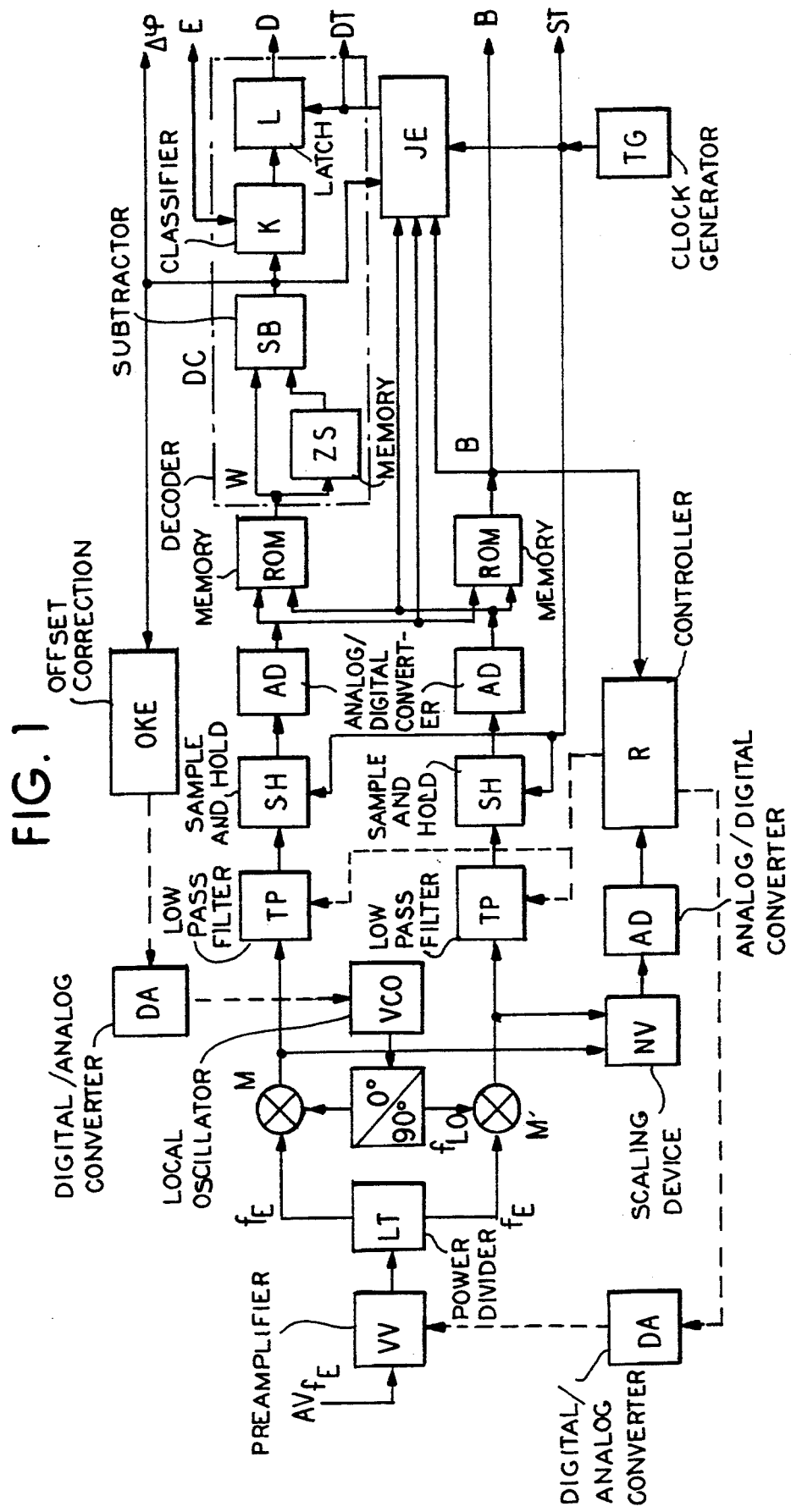
FIG. 1 shows a block diagram of the first illustrative embodiment.

The block diagram of a receiver for signals digitally modulated at two and four stages for use in mobile communication systems is shown in FIG. 1. The first illustrative embodiment is explained with reference to this figure with incidental explanation of FIGS. 2–4 and with tables. It is a homodyne, incoherent, digital vector receiver with a mixing stage. Analog signal paths are marked as single lines, digital data paths are marked as double lines. The control branches are correspondingly dashed.

A preamplifier VV, connected to an antenna A, boosts the input level with low noise and low intermodulation and at the same time effects a decoupling of the antenna A from the inputs of the mixing stage. This radio-frequency prestage includes only a fixed, rough preselection of the input frequency range. In addition, the preamplifier VV is provided with a variable gain in order to permit a partial compensation of the dynamic range of the input signal.

In the mixing stage, the input signal is converted in one step from the receive frequency $f_E$, about 2 GHz, into a baseband. In order to preserve the full informational content, the reception signal must be split into a real component and an imaginary component. This takes place by means of a quadrature demodulator, which comprises a power divider LT and two identical mixers M, which are fed with a signal phase-shifted by 0° and a signal phase-shifted by 90° of a local oscillator VCO with an oscillator frequency $f_{LO}$.

The local oscillator VCO is not coupled in locked-phase and locked-frequency relation to the input carrier frequency. In order to keep a carrier frequency offset between the receive frequency $f_E$ and the oscillator frequency $f_{LO}$ as small as possible, a tuning input is provided for a rough frequency correction at the local oscillator VCO. The tuning voltage is determined in an offset correction device OKE. However, the frequency difference between receive frequency $f_E$ and oscillator frequency $f_{LO}$ should not be more than 5 ppm.

After the mixers M, the useful signal, heterodyned with noise and adjacent-channel signals, is available in the baseband. Two low-pass filters TP with linear delay effect the main selection of the receiver. They contain DC isolating capacitors for suppressing DC components of the useful signal and therefore act as broadband band pass filters. The gain of the individual filter stages can be set digitally, so that here too a dynamic-range compensation can be carried out. After the filter stages, the real component and the imaginary component of the reception signal would be available in band-limited, amplitude-continuous and time-continuous form.

After the low-pass filters TP, the signals are periodically sampled with a system clock ST in the real branch and the imaginary branch by sample-and-hold sections SH and are digitized in two analog-digital converters AD. Due to the dynamic-range compensation at the preamplifier VV and at the low-pass filters TP, the dynamic-range fluctuations are restricted to a few dB and a resolution of the analog-digital converters AD of 5–8 bits is adequate. The system clock ST is generated by a clock generator TG and has a frequency of 8.8 MHz. Thereafter, the real component and the imaginary component of the input signal are available at any time as binary numerical values. The data rate is 1.1 Mbit/sec with a data clock DT of 1.1 MHz, whereby an 8-fold oversampling is accomplished by the system clock ST.

Since the information received is coded as the difference in angle between sampling times, a value conversion table in permanent memories ROM is used to convert the real component and the imaginary component into the magnitude and angle of a complex vector. The numerical values for the real component and the imaginary component form the data addresses of the permanent memories ROM; magnitude value B and angle value W are obtained at the data output. The magnitude value B is used for setting the gain in the preamplifier VV and in the low-pass filters TP of the main selection.

The angle information is coded in such a way that N bits with a range of values of $2^N$ correspond to the full angle of 360° (see Table 1). This coding allows correct-sign, binary angle addition and subtraction by two's complement beyond 360°.

| Angle | Binary code |
| --- | --- |
| 0° | 0000 |
| +22.5° | 0001 |
| +90° | 0100 |
| +180° = −180° | 1000 |
| +270° = −90° | 1100 |
| +337.5° = −22.5° | 1110 |
| +360° = 0° | 0000 |

Tab. 1: Angle coding with 4 bits (excerpt)

A subtracter SB forms the difference between the current angle value W and the angle value W of the previous sampling time, stored in a buffer memory ZS. A classification, dependent on the selected modulation method, of the magnitude of the difference in angle $\Delta\phi$ in decision areas E (Table 2) then supplies demodulated reception data D, the sampling time of which is determined in an adjusting device JE. For this purpose, a classifier K and a latch L are combined with the subtracter SB to form a decoder DC. The value is selected from the latch L. On account of the decision areas E, the vector receiver can be changed over automatically by a following microcomputer to different modulation methods. This makes it possible to set up a multi-standard device.

| Modulation method | Decision areas E |
| --- | --- |
| BAM, BPSK | $\Delta\phi \leq +90°$, $\Delta\phi > +90°$ |
| QAM, WPSK | $-45° \leq \Delta\phi < +45°$, $+45° \leq \Delta\phi < +135°$ |
| | $+135° \leq \Delta\phi < +225°$, $-135° \leq \Delta\phi < -45°$ |
| MSK, GMSK | $0° \leq \Delta\phi < +180°$, $-180° \leq \Delta\phi < 0°$ |

Tab. 2: Decision area of the vector receiver for two-stage and four-stage modulation methods In order to make a correct assignment by the classifier K possible, the phase shift which is produced by the incoherence of input signal and local oscillator VCO per bit must be less than half the angle of a decision area E. It follows from this that the maximum permissible difference in frequency $f_{0,max}$ between reception signal and local oscillator signal is $$f_{0,max} = \frac{\Delta\phi_E}{4 \cdot \pi \cdot T_{bit}}$$

In the equation, $\Delta\phi_E$ denotes the angle of a decision area E and $T_{bit}$ denotes the bit period, which is the reciprocal of the data clock DT.

On account of the difference in frequency between input frequency $f_E$ and oscillator frequency $f_{LO}$, the differences in angle $$\Delta\phi = \Delta\phi_{bit} + 2\cdot\pi\cdot(f_E - f_{LO})\cdot t$$

for modulation with positive and negative phase shift $\Delta\phi_{bit}$ are not symmetrical. The carrier frequency offset $\Delta f$ is calculated by the offset correction device OKE from the difference in phase deviations as $$\Delta f = \frac{\Delta\phi + - \Delta\phi -}{2\cdot\pi\cdot T_{bit}}$$

With known voltage dependence of the frequency of the local oscillator VCO, a frequency correction signal is derived as tuning voltage.

Figure 2:
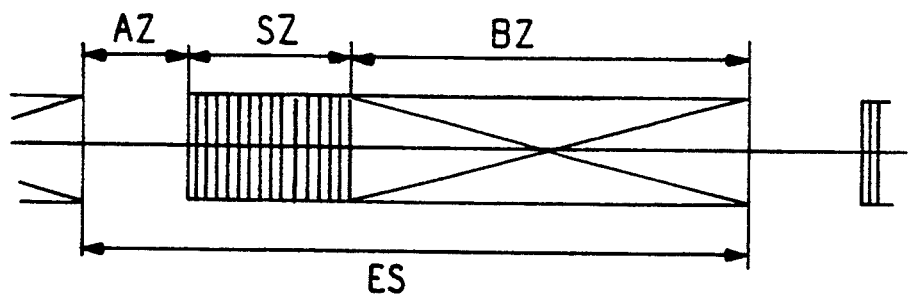
FIG. 2 shows the timing structure of the reception signal.

As FIG. 2 shows, a synchronization sequence has to be transmitted at the beginning of each reception sequence ES to determine the sampling time. This is initiated by gating out the transmission signal for a short time. This produces the timing structure of the reception signal with gating-out time AZ, synchronization time SZ and bit-transmission time BZ. Over which time the sampling time is then valid is decided by the stability of the transmission data clock and the reception data clock, as well as the fineness of the time resolution for the sampling within a bit. The number N of the validly received bits is obtained as $$N = \frac{1}{2\cdot OV \cdot \Delta f_{takt,max} \cdot T_{bit}},$$

$\Delta f_{clock,max}$ being the maximum difference in clock frequency between transmitter and receiver and OV (oversampling) being the number of possible sampling times per bit. After a maximum of N data bits, a fresh synchronization sequence must be transmitted in order that the receiver can update the sampling time. With $OV = 8$ and a data clock accurate to within 50 ppm ($\Delta f_{clock,max} = 50\cdot 10^{-6}$) and $T_{bit} = 909.1\cdot 10^{-9}$ sec there are 1250 validly received bits (N).

Figure 3:
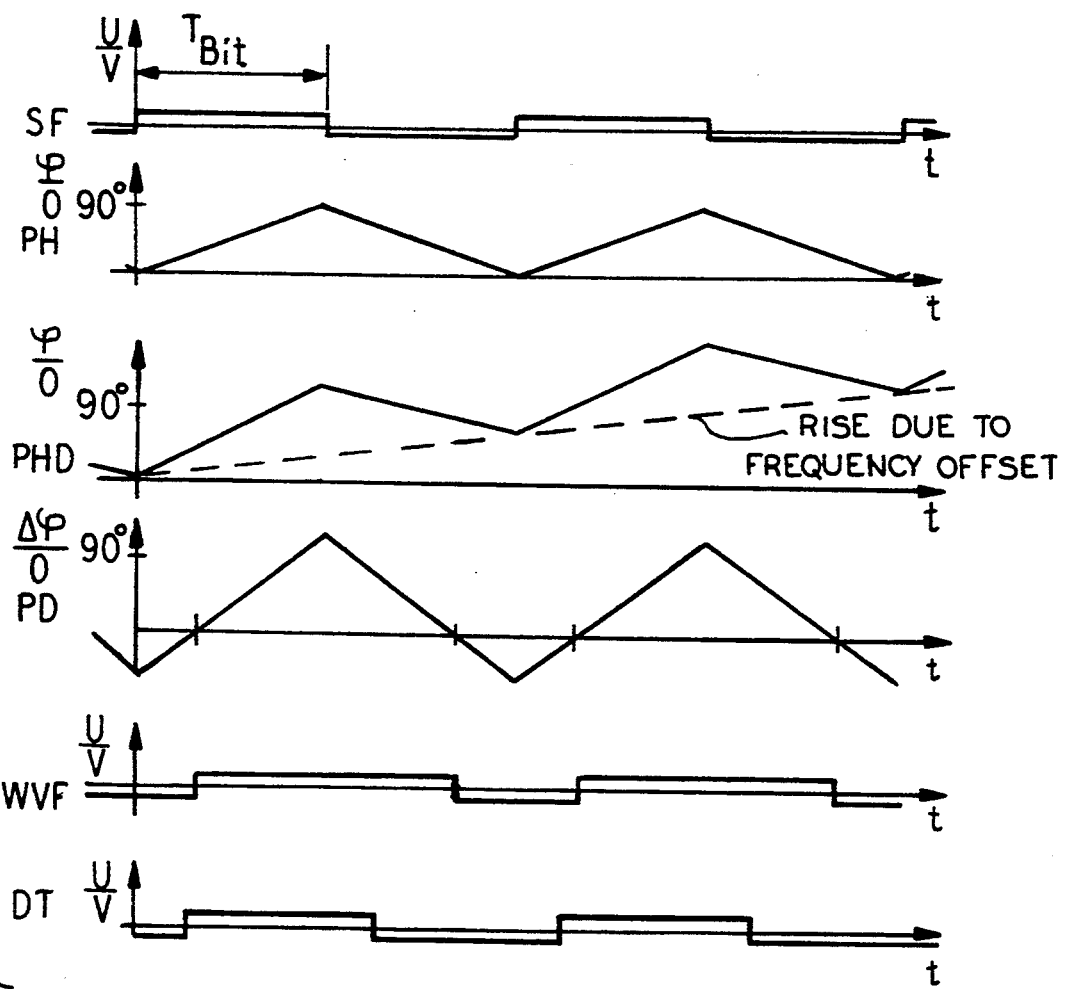
FIG. 3 shows the phase response in angle modulation for determining the sampling time and FIG. 4 shows the signal response for determining the sampling time in the case of linear modulation methods.

For the linear and non-linear modulation methods, various synchronization methods are used for determining the sampling time. In the case of the non-linear modulation methods (MSK, GMSK), as shown in FIG. 3 for MSK, a periodic phase deviation PH can be produced by modulation with a synchronization sequence SF corresponding to a data sequence $d(t) = +1, -1, +1, -1, +1 \ldots$ In the case of non-linear modulation methods, the magnitude of the vector is constant (constant envelope). In the demodulation, the phase deviation PH increases constantly as a consequence of the carrier frequency offset. By 8-fold oversampling and phase subtraction with the value preceding by 1 bit for each sampling time within a bit, a phase difference PD can be formed. The angle sign function WVF thereof corresponds to the synchronization sequence SF shifted by $T_{bit}/2$. By phase comparison with the data clock DT and forming the average over time, the sampling time can be determined very accurately therefrom, even in the case of noisy input conditions.

Figure 4:
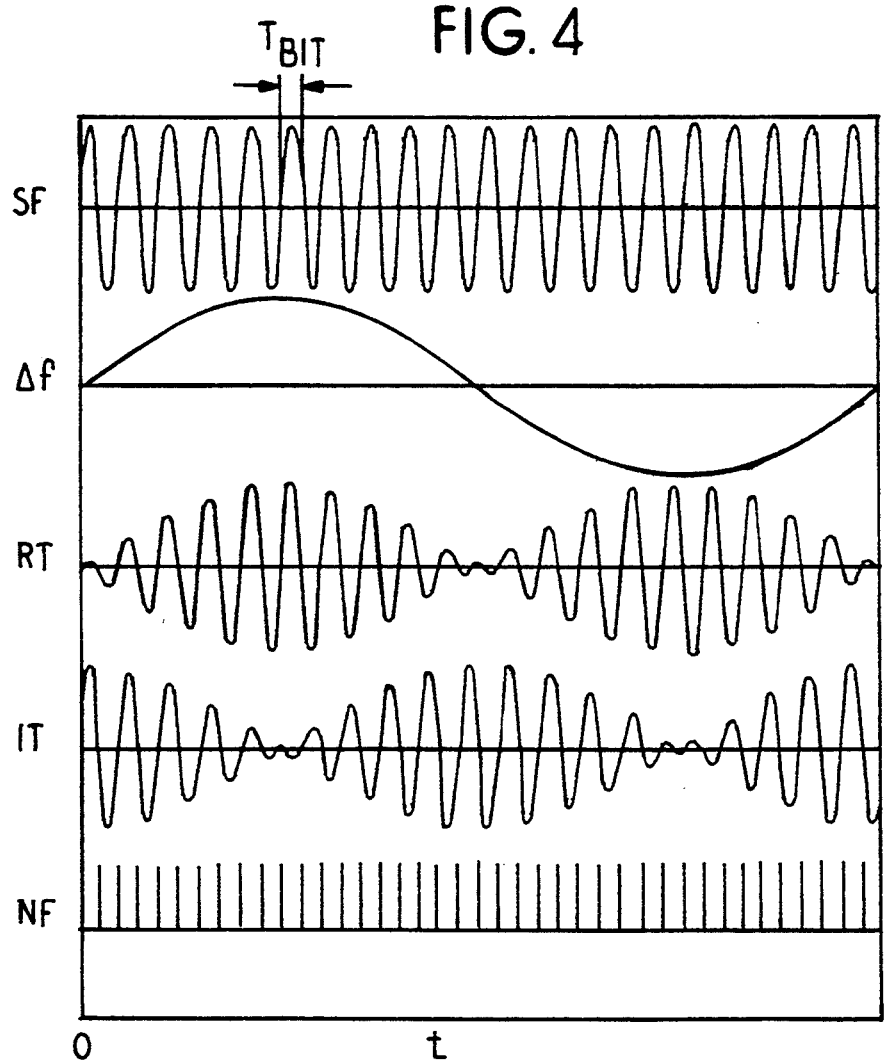

In the case of the linear modulation methods (BAM,BPSK,QAM,QPSK), a data-clock periodic zero transition of the reception signal can be produced by modulation with the synchronization sequence SF, as shown in FIG. 4 for linear amplitude modulation with suppressed carrier. The variation of the carrier frequency offset $\Delta f$, as well as the variation of the real component RT and the imaginary component IT of the reception signal are shown. The magnitude of the vector is variable in the case of linear modulation methods. After forming the sign function VZF of the real component RT and of the imaginary component IT, narrow pulses are generated by means of digital differentiation at the time of the zero transition. They form a zero transition pulse sequence NF. By measuring the position in time of the pulses in relation to the system clock and averaging over a number of bits, the sampling time is obtained with high reliability, even in the case of noisy reception conditions.

The automatic gain control is a controller R of a digital type, shown in FIG. 1. It has the task of keeping the signal level, which fluctuates during operation, constant to within a few dB when driving the digital-analog converters DA in a medium range. As actual level value, the magnitude value B, formed in the permanent memory ROM, is read into the controller R. The controller R must operate so slowly that it cannot follow the brief dips in level before the synchronization times. To reduce intermodulation interferences, the non-band-limited signal power available after the mixers M is used as the parameter for dividing the gain over the RF prestage and the main selection stages. The parameter is determined by forming the magnitude of the reception vector in a scaling device NV.

Figure 5:
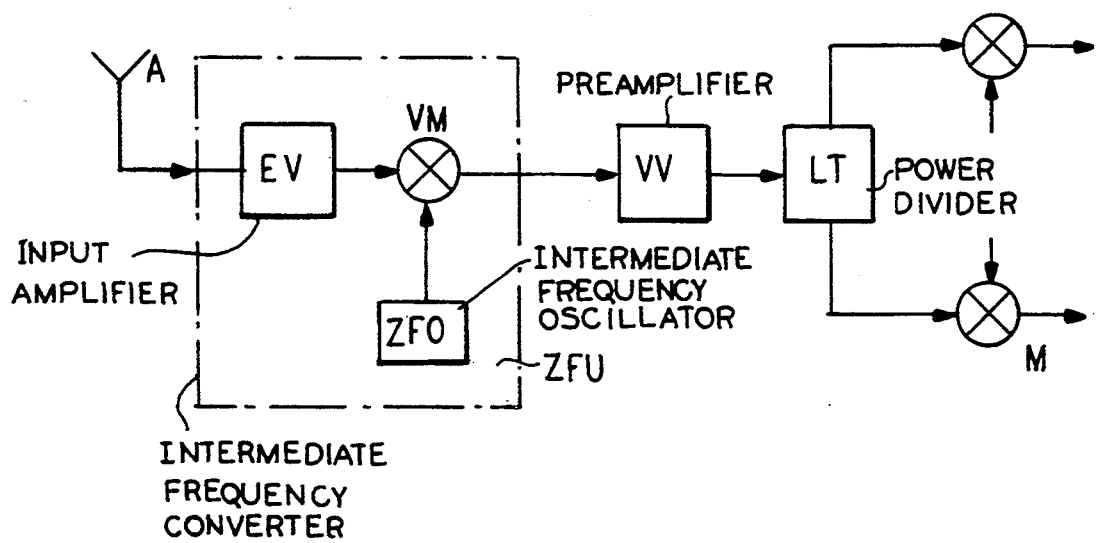
FIG. 5 shows a block diagram of the second illustrative embodiment.

FIG. 5 shows the diagrammatic block diagram of a heterodyne vector receiver as second illustrative embodiment. It operates like the vector receiver of the first illustrative embodiment with incoherent demodulation. The signal received via the antenna A is reduced by means of an intermediate-frequency converter ZFU from 60 GHz to 2 GHz. Consequently, a vector receiver of the same design as in the first illustrative embodiment can be used modularly for the reception of satellite signals. The processing of the reception signal after the preamplifier VV remains the same. The intermediate-frequency converter ZFU contains an input amplifier EV, which is followed by a premixer VM. The premixer VM is connected to an intermediate-frequency oscillator ZFO.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method of converting a digitally modulated reception signal from a radio-frequency range, comprising the steps of: converting the reception signal, which can be represented as a complex vector, incoherently into a baseband, the reception signal being split into a real component and an imaginary component, continuous in time and amplitude, a phase difference per bit period due to the incoherent conversion being kept to less than half a phase shift caused by a modulation per bit, the real and imaginary components being subsequently amplified, filtered and sampled, a sampling time being determined within a preceding synchronization time, the sampled real and imaginary components being subsequently digitized thereby providing sampled values that are value-converted as a pair of binary numbers for magnitude value and angle value of the vector, using the magnitude value to adjust a level of the real and imaginary components in the step of amplifying, filtering and sampling the real and imaginary components, the magnitude value serving for gain control thereof; and recovering reception data from a difference between two successive angle values of respectively two successive sample times after a classification, dependent on a selected modulation method, of the magnitude of the difference between said two successive angle values.

2. The method as claimed in claim 1, wherein the angle value is buffer-stored over a bit period, subtracted from a following angle value by two's complement and the reception data recovered from the classification of the result of the subtraction dependent on the modulation method used.

3. The method as claimed in claim 1, wherein the sampling time for the angle value of a linearly modulated reception signal is determined within a synchronization time before transmission of valid data by a variation of the magnitude of the reception signal being modulated with a synchronization sequence and, after conversion into the baseband, a sign function formed and digitally differentiated, a zero pulse sequence being formed, timing of the pulses of the zero pulse sequence measured in relation to a system clock and averaged over several bits.

4. The method as claimed in claim 1, wherein the sampling time for the angle value of a non-linearly modulated reception signal is determined within a synchronization time before transmission of valid data by a carrier which has been angle-modulated with a synchronization sequence being oversampled after conversion into the baseband from which a phase deviation is obtained, from the phase deviation a phase difference being formed by subtracting over a bit period, an angle sign function of the phase difference being compared in terms of phase with a data clock and the phase shift averaged over several bits.

5. A receiver for receiving digitally modulated signals in a mobile communication system, comprising: an antenna connected to at least one mixing stage for a reception signal, which can be represented as a complex vector, the mixing stage having two outputs connected respectively to two low-pass filters, each of which are connected on an output side via an analog/digital converter to a value converter, wherein the low-pass filters are provided with variable gain, wherein the value converter includes means for determining a magnitude value and an angle value of the vector of the reception signal from its real component and an imaginary component of the reception signal and is connected to a decoder for reception data recovery, and wherein an adjusting device is connected to the value converter and the decoder for determining a sampling time that is supplied to the decoder wherein a gain factor of the low-pass filters is digitally set and the value converter is coupled back to the low-pass filters for this control, and wherein the low-pass filters contain DC isolating capacitors.

6. The receiver as claimed in claim 5, wherein the mixing stage is a quadrature demodulator having two mixers which are connected to a local oscillator for feeding with an oscillator signal phase-shifted by 0° and 90°, respectively and wherein the local oscillator has a tuning input, which is connected to an offset correction device.

7. The receiver as claimed in claim 5, wherein the value converter has two permanent memories, data addresses of which are formed by numerical values of sampled values for the real component and the imaginary component and wherein the magnitude value and the angle value are available at data outputs of the respective permanent memories.

8. The receiver as claimed in claim 5, wherein the mixing stage is preceded by at least one intermediate-frequency converter.

* * * * *